UNITED STATES PATENT OFFICE.

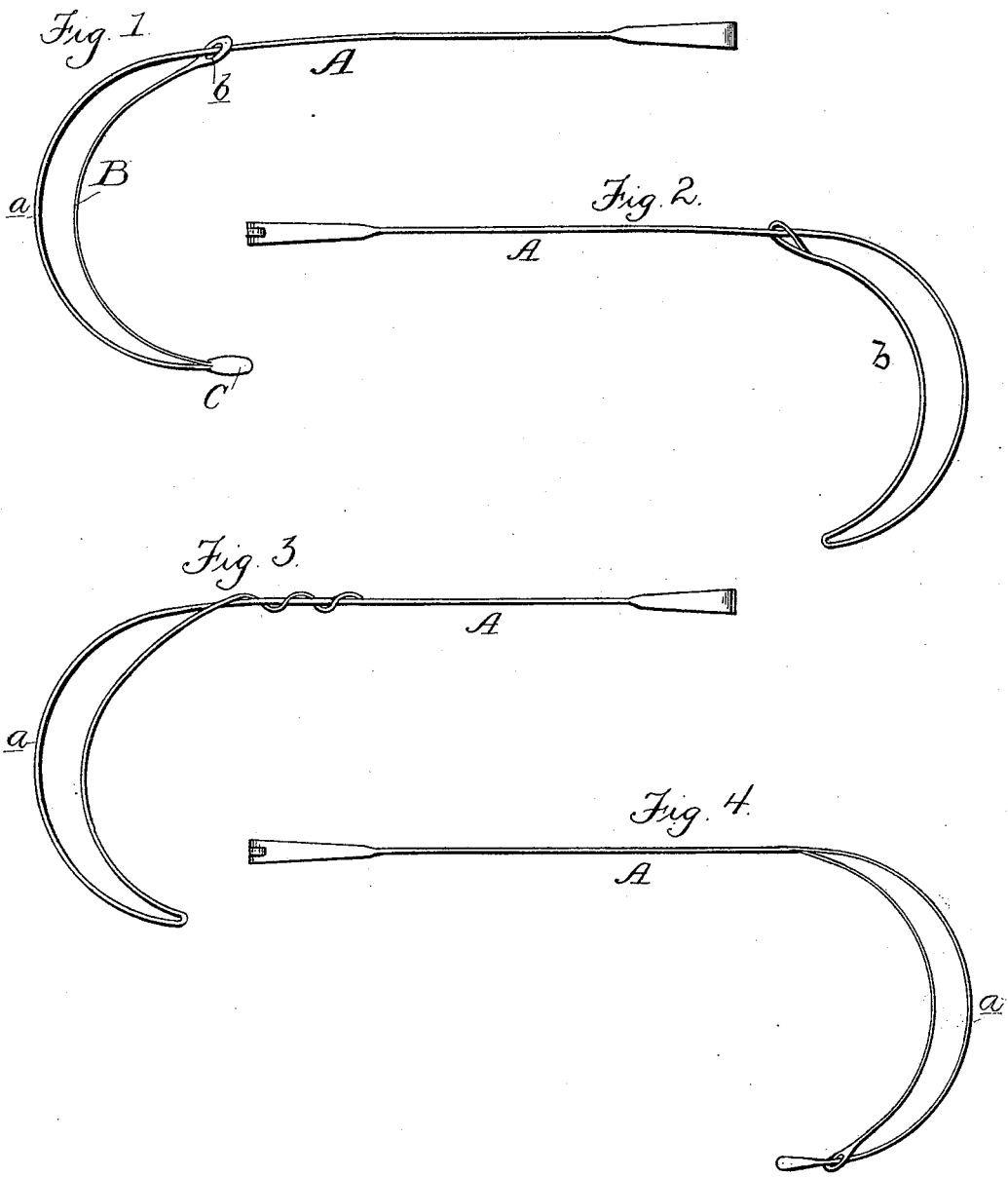

OSCAR JOHN HALBE, OF CHICAGO, ILLINOIS, ASSIGNOR OF ONE-HALF TO HENRY BORSCH, OF SAME PLACE.

SPECTACLES.

SPECIFICATION forming part of Letters Patent No. 460,576, dated October 6, 1891.

Application filed April 3, 1891. Serial No. 387,508. (No model.)

*To all whom it may concern:*

Be it known that I, OSCAR JOHN HALBE, a citizen of the United States, residing at Chicago, in the county of Cook and State of Illinois, have invented certain new and useful Improvements in Spectacles, of which the following is a specification, reference being had therein to the accompanying drawings.

This improvement relates to that class of spectacle-temples in which hooks are used; and the invention consists in the peculiar construction, arrangement, and combination of parts hereinafter more particularly described and then definitely claimed.

In the accompanying drawings, Figure 1 is a perspective view of a hook-temple for spectacles made according to the preferable form of my improvement. Figs. 2, 3, and 4 are similar views of modifications thereof.

All the figures are shown on a larger scale the better to show the improvement.

In the ordinary form of temple the hook part, if made sufficiently strong not to get broken or bent out of shape, is apt to irritate the tender skin behind the ear, and the object of my improvement is to avoid this, which I do by providing the same with a spring, as shown in the drawings, in which A represents the temple, having a hook $a$, and B a light spring, which is preferably of considerably lighter metal than the side or hook. I prefer to form an eye $b$ by making a hole in one end of this spring, which is flattened for this purpose, and through this eye I pass the hook $a$ of the temple A and fasten the hook $a$ to the spring B in any convenient manner, but preferably by a small lump of solder C, of any approved material, at the extreme end of the hook.

I sometimes make the temple and spring in one piece, as shown in Fig. 2, in which case I form an eye in the extreme end of the spring part by bending the same, as shown, loosely around the temple A. In this case I also prefer to reduce the size of the wire of which the spring is formed. Instead of making the eye as shown in Fig. 2, I may leave the end longer and twist it around the temple, as shown in Fig. 3.

In some cases I may unite the top end of the spring to the temple at or near the top of the hook and slip the end of the same through an eye formed in the lower end of the spring.

From the above description it will be seen that the temples may be made as strong as desired with a very light spring inside of the curve or hook to come in contact with the ear, thus combining great strength with ease to the wearer, for while the spring may be as light as desired it is protected from breakage by being inclosed within the hook of the temple.

I do not limit myself to the exact construction shown, as it is obvious that many changes may be made without departing from the spirit of my invention. For instance, the eye $b$ may be dispensed with and the upper end of the spring left free; but I prefer to use the eye.

I am aware that it has been proposed to make temples with spring ends, and also to make them of wire with the free ends "returned" or coiled, these features being shown in the United States Patents No. 104,656, to C. Cree, June 21, 1870; No. 170,644, to J. W. Stewart, November 30, 1875; No. 190,530, to C. Yocco, May 8, 1887, and No. 444,505, to B. I. Price, January 13, 1891; but my invention differs essentially from any or all of the devices described in said patents.

What I claim as new is—

1. The combination, with a hook-temple of spectacles, of a spring extending along the inside of the curve of the hook and free from contact therewith at the central part of the same, substantially as described.

2. The combination, with a hook-temple of spectacles, of a spring connected to the hook, having a flatter curve than the hook and arranged within the curve of the hook, substantially as described.

3. The combination, with a hook-temple of spectacles, of a spring connected to the hook, of thinner material than said hook and arranged within the curve of the hook, substantially as described.

4. The combination, with a hook-temple of spectacles, of a separate spring B, of lighter material than the hook, having one end provided with an eye $b$ loosely encircling the side and having its other end fixedly attached by soldering the same to the extreme end of the hook and arranged within the curve of the hook, substantially as described.

In testimony whereof I affix my signature, in presence of two witnesses, this 1st day of April, 1891.

OSCAR JOHN HALBE.

Witnesses:
F. C. NEUHALFER,
C. GILKEY.